United States Patent [19]

Maruyama

[11] Patent Number: 5,834,608
[45] Date of Patent: Nov. 10, 1998

[54] METHOD FOR PRODUCING COPPER PHTHALOCYANINE IN A REACTION MEDIUM CONTAINING SULFUR

[75] Inventor: Kazuhiro Maruyama, Kawasaki, Japan

[73] Assignee: Kawasaki Kasei Chemicals Ltd., Tokyo, Japan

[21] Appl. No.: 656,866

[22] Filed: May 30, 1996

[30] Foreign Application Priority Data

Jun. 21, 1995 [JP] Japan .................................. 7-154256

[51] Int. Cl.$^6$ .................. C07D 487/22; C09B 47/06; C09B 47/04
[52] U.S. Cl. .................. 540/144; 540/122; 540/139; 540/142
[58] Field of Search .................................. 540/139, 140, 540/141, 142, 144

[56] References Cited

U.S. PATENT DOCUMENTS

| 4,906,747 | 3/1990 | Segawa et al. | 540/144 |
| 5,153,314 | 10/1992 | Segawa et al. | 540/144 |
| 5,496,939 | 3/1996 | Maruyama | 540/139 |

FOREIGN PATENT DOCUMENTS 0266219  4/1988  European Pat. Off. .

*Primary Examiner*—Mukund J. Shah
*Assistant Examiner*—Pavanaram K. Sripada
*Attorney, Agent, or Firm*—Oblon, Spivak, McClelland, Maier & Neustadt, P.C.

[57] ABSTRACT

Copper phthalocyanine is prepared by heating and reacting phthalic acid or a derivative thereof, urea or a derivative thereof and copper or a copper compound in the presence of molybdenum or a molybdenum compound as a catalyst and sulfur.

22 Claims, No Drawings

METHOD FOR PRODUCING COPPER PHTHALOCYANINE IN A REACTION MEDIUM CONTAINING SULFUR

The present invention relates to a method for producing copper phthalocyanine which contains little impurities or free copper and whereby pigmentation is very easy.

A method for producing copper phthalocyanine which comprises heating phthalic acid or a phthalic acid derivative (hereinafter referred to as "phthalic acid or its derivative"), urea or a urea derivative (hereinafter referred to as "urea or its derivative") and a copper compound in the presence of a phthalocyanine-forming catalyst such as a molybdenum compound in an inert organic solvent, is known as an industrially established method.

In order to obtain copper phthalocyanine useful for pigmentation by this method, it is industrially common to employ a post treating method wherein after completion of the reaction under heating, the solvent is distilled off under reduced pressure from the reaction product, and the obtained residue is washed with hot water.

However, in such copper phthalocyanine, non-reacted reactants, free copper and other impurities are likely to remain in substantial amounts, which tend to cause troubles in the subsequent pigmentation. As the pigmentation, a dry milling method (e.g. Japanese Unexamined Patent Publication No. 320458/1992) may, for example, be mentioned which is a pigmentation method which comprises dry pulverization, followed by treatment with a solvent. In such a dry milling method, if such impurities are present, a crystal transformation rate usually tends to be slow, whereby deterioration is observed in the quality of pigmentation such as clearness or a tinting degree.

Further, in recent years, in a case where treatment such as pigmentation of copper phthalocyanine is to be carried out, it is required that a copper compound should be as little as possible in the waste liquid discharged from the treatment.

It is economically preferred to use the copper phthalocyanine product obtained by washing with hot water. However, as mentioned above, presence of substantial amounts of free copper and other impurities is problematic from the environmental viewpoint and in the use of the product. Therefore, instead of the hot water washing, acid washing with e.g. dilute sulfuric acid is sometimes carried out to reduce free copper and other impurities. In such a case, however, there is a drawback that yield of the product tends to be low, and a step of neutralizing the acid used, is required.

Accordingly, it is an object of the present invention to reduce the amount of impurities over the conventional method for producing copper phthalocyanine and thereby crystal transformation is easy in pigmentation such as in treatment with a solvent in the dry milling method and to provide a method for producing a product which contains little free copper.

The present inventors have studied impurities in a so-called Wyler method which is a conventional method for producing copper phthalocyanine, and as a result, have found that impurities extracted by N,N-dimethylformamide (hereinafter referred to simply as DMF) remarkably impair the crystal transformation rate in pigmentation, particularly in the solvent treatment in a dry milling method. On this basis, an effective method for production has been researched using the amount of such impurities as an index, and as a result, it has been found possible to solve the above problems by adding a very small amount of sulfur to the reaction system. On the basis of this discovery, the present invention has been accomplished.

Thus, the present invention provides a method for producing copper phthalocyanine, which comprises heating and reacting phthalic acid or a phthalic acid derivative, urea or a urea derivative, and a copper compound, using molybdenum or a molybdenum compound as a catalyst, in the presence or absence of an inert organic solvent, wherein sulfur is added to the reaction system.

Now, the present invention will be described in detail with reference to the preferred embodiments.

As the phthalic acid or its derivative to be used in the method of the present invention, any material may be employed so long as it is finally obtained in the form of copper phthalocyanine or its derivative. For example, it may be phthalic acid, phthalic anhydride, phthalimide, a salt such as sodium phthalate, phthalamic acid, phthalonitrile, or a mixture thereof. Such a phthalic acid or its derivative may have a substituent inert in the reaction system, such as an alkyl group, a benzyl group, a cycloalkyl group, a phenyl group or a chlorine group.

As the urea or its derivative, urea, biuret or triuret may be mentioned. It is usual to employ urea, which may contain biuret, triuret or the like. The amount of the urea or its derivative may vary depending upon the type of the phthalic acid or its derivative, but it is usually selected within a range of from 1.5 to 3.5 mols, preferably from 2.0 to 3.0 mols, per mol of the phthalic acid or its derivative.

As the copper compound, copper powder, copper oxide, copper hydroxide, copper sulfate, cuprous chloride, cupric chloride or copper acetate may, for example, be mentioned. However, it is usual to employ a chloride of copper such as cuprous chloride. The amount of the copper compound is selected usually within a range of from 0.2 to 0.3 mol, preferably from 0.23 to 0.27 mol, per mol of the phthalic acid or its derivative.

The molybdenum or the molybdenum compound as the catalyst may, for example, be metal molybdenum, a molybdate such as ammonium molybdate or sodium molybdate, or a molybdenum compound such as ammonium phosphorus molybdate or molybdenum oxide. However, it is usual to employ ammonium molybdate. The amount of the catalyst is usually from 0.003 to 5 wt %, preferably from 0.02 to 0.5 wt %, relative to the phthalic acid or its derivative.

In the present invention, the solvent may be an inert organic solvent which is commonly used for the preparation of copper phthalocyanine by a conventional urea method i.e. a so-called Wyler method, so long as such a solvent is suitable for the purpose of the present invention. For example, an aliphatic hydrocarbon solvent, an aromatic hydrocarbon solvent or such a solvent modified by e.g. halogen may be mentioned. Specifically, it may, for example, be an inert alkylbenzene type solvent such as diisopropylbenzene, monoisopropylxylene, diisopropyltoluene or tert-amylbenzene, a naphthalene type solvent such as isopropyl naphthalene or tert-butylnaphthalene, a halogenated aromatic solvent such as trichlorobenzene, or a nitromodified aromatic solvent such as nitrobenzene. These solvents may be used alone or in combination as a solvent mixture. Taking into the environmental hygiene and the price into consideration, an aromatic hydrocarbon solvent, particularly an alkylbenzene solvent, is preferred.

The amount of the solvent is usually from 1.5 to 7 times by weight, preferably from 1.7 to 3 times by weight, relative to the phthalic acid or its derivative.

Further, by using urea excessively so that it serves also as a solvent, the reaction of the present invention can be carried out in the absence of an organic solvent.

With respect to the reaction conditions for the production of copper phthalocyanine in the present invention, the temperature for the reaction under heating is selected usually within a range of from 140° to 250° C., preferably from 170° to 220° C., and the reaction pressure is selected within a range of from 0 to 20 kg/cm$^2$G, but is preferably within a range of from 2 to 5 kg/cm$^2$G taking into consideration a loss of the solvent as discharged out of the reaction system together with the reaction gas, decomposition of the urea as starting material, decomposition of the phthalic acid or its derivative, a loss out of the system in the form of an intermediate product such as ammonium cyanate, the operation efficiency of the reactor, etc.

The reaction method is carried out in a batch system or a continuous system. After completion of the reaction, the solvent is removed from the reaction product by e.g. distillation under reduced pressure, and the obtained residue is washed with hot water (60° to 80° C.) in an amount of from 3 to 10 times by weight. When a product of a higher purity is required, it is possible to employ a purification method in which the residue obtained after removal of the solvent is washed with dilute sulfuric acid (e.g. from 5 to 10 times by weight).

As the sulfur to be used in the present invention, any form of sulfur may be employed, for example, crystalline sulfur such as rhombic or monoclinic sulfur or amorphous sulfur. However, it is usually economical to employ rhombic sulfur which is readily available and which is stable.

With respect to the manner of adding sulfur, sulfur may be added by itself to the reaction system together with the starting materials such as phthalic acid or its derivative and urea or its derivative. Otherwise, it may be added as preliminarily dissolved or dispersed in a solvent to be used for the reaction.

Otherwise, sulfur may be added to molten urea together with copper chloride and a molybdenum compound, so that it will be added to the reaction system. In such a case, at least a part of the added sulfur is believed to react with the copper compound to form copper sulfide before it is added to the reaction system.

The amount of the sulfur to be added is selected within a range of from 0.05 to 4 wt %, preferably from 0.1 to 1 wt %, relative to the phthalic acid or its derivative. If the amount is less than 0.01 wt %, no substantial effects can be obtained, and if it exceeds 4 wt %, the effects will be the same, and such an excess amount will be uneconomical.

Further, in addition to the sulfur, a metal sulfide such as sodium sulfide may be present, so that they may be substantially in the form of a polysulfide.

Further, instead of adding sulfur, a copper sulfide may be used as a part of the copper compound to obtain substantially the same effects as adding sulfur. As the copper sulfide, cuprous sulfide (copper (I) sulfide), cupric sulfide (copper (II) sulfide) or copper polysulfide may be mentioned. However, readily available cupric sulfide is usually preferred. The amount of the copper sulfide is selected usually within a range of from 0.05 to 4 wt %, preferably from 0.1 to 1 wt %, as calculated as sulfur, to the phthalic acid or its derivative. If the amount is less than 0.01 wt %, no substantially effects will be observed, and if it exceeds 4 wt %, the effects will be the same, and such an excess amount will be uneconomical.

Copper phthalocyanine thus obtained by the addition of sulfur or by means of the copper sulfide, contains little free copper or impurities extractable by DMF. Accordingly, it has a feature that when it is used in a pigmentation step, particularly in a dry milling step, the pigmentation or dry milling can advantageously be proceeded.

Now, the present invention will be described in further detail with reference to Examples and Comparative Examples. However, it should be understood that the present invention is by no means restricted to such specific Examples. In the following description, "%" means "% by weight" unless otherwise specified. The free copper content and the numerical values used for e.g. impurities extracted by DMF were determined by the following measuring methods. Further, a comparison in the quality of pigmentation products by a dry milling method is also shown below.

(1) Measuring method for the free copper content 3.0 g of copper phthalocyanine was accurately weighed and dissolved by an addition of 30.0 g of sulfuric acid. Then, the solution was added to 150 g of cool water, followed by stirring for 30 minutes at 90° C. Then, the precipitate was collected by filtration, and the obtained cake was washed with deionized water. The obtained filtrate (inclusive of the water used for washing the cake) was cooled to room temperature, and the total amount was adjusted to 500 ml. The copper ion concentration in this solution was measured by atomic absorptiometry and represented by the weight percentage (as calculated as metal copper) relative to the sample used.

(2) Measuring method for impurities extracted by DMF (hereinafter referred to as DMF impurities)

10.0 g of copper phthalocyanine was accurately weighed and treated with 100 g of DMF at 140° C. to extract impurities. The insoluble content was filtered off, and then DMF was distilled under reduced pressure, and the obtained residue was regarded as impurities and represented by the weight percent relative to the sample used.

(3) Comparison in the quality of pigmentation products by a dry milling method

In a dry milling method, copper phthalocyanine is firstly dry-pulverized by a ball mill for the pulverization. At that time, the crystal form of copper phthalocyanine will partially be converted from the β-form to the α-form, to form firm aggregation. Therefore, the product can not be used as a pigment by itself.

Accordingly, the powder is further subjected to dipping treatment in a solvent, e.g. an aromatic solvent such as toluene or xylene, an alcohol such as propanol or ethylene glycol, or a diol, to convert α-form crystals to the β-form and at the same time to disperse it in the solvent to obtain copper phthalocyanine suitable as a pigment.

Accordingly, in the pigmentation by this method, it is preferred that α-form crystals formed at the time of dry pulverization are little, and the transformation of the α-form to the β-form swiftly proceeds at the time of the treatment with an organic solvent.

In the present invention, the comparison in the quality of the pigmentation products by the dry milling method was carried out as follows.

100 g of copper phthalocyanine was dry-pulverized in a ball mill for 10 hours at a temperature of from 20° to 30° C. Then, it was subjected to dipping treatment in isopropanol at 35° C. With respect to the sample as the time passed during this solvent treatment, the diffraction intensities attributable to the α-form and β-form crystals were measured by a powder X-ray diffraction method, and the proportion of the α-form crystals was obtained by percentage, which was used as the index for the quality of the pigmentation product.

EXAMPLE 1

180 g of phthalimide, 30.3 g of cuprous chloride, 170 g of urea, 0.09 g of ammonium molybdate, 310 g of tert-amylbenzene (Hizol P, tradename, manufactured by Nippon Oil Co., Ltd., an alkylbenzene mixture) as a solvent and 0.9 g of sulfur, were charged into a 1 l glass autoclave and reacted for 3.5 hours under a pressure of 2.5 kg/cm$^2$G while gradually raising the reaction temperature from 170° C. to 210° C. From the formed slurry, the solvent was distilled off under a reduced pressure of 5 mmHg at 175° C. for 3 hours.

To the residue, 1,200 g of water was added, and the mixture was stirred at 60° C. for 2 hours for hot water washing and subjected to filtration. The cake thereby obtained was washed with 800 g of hot water of 60° C. and dried to obtain 172 g of copper phthalocyanine (such a product washed with hot water will hereinafter be referred to as "a hot water-washed product"). The amount of the DMF impurities in this hot water-washed product was 2.3%, and the free copper was 0.51%.

On the other hand, the above residue was subjected to slurry washing with 1,200 g of 1% dilute sulfuric acid at 60° C. for 2 hours and subjected to filtration. Then, it was washed with hot water of 60° C. until no acid was detected in the washing water and dried to obtain 169 g of copper phthalocyanine (such a product washed with dilute sulfuric acid will hereinafter be referred to as "an acid-washed product"). The amount of the DMF impurities in this acid-washed product was 0.7%, and the free copper was 0.17%. The results of tests on the quality of pigmentation products of such hot water-washed product and acid-washed product by a dry milling method are shown in Tables 1 and 2.

EXAMPLE 2

The operation was conducted in the same manner as in Example 1 except that the amount of sulfur added, was changed to 0.36 g, to obtain 173 g of copper phthalocyanine as a hot water-washed product. The amount of the DMF impurities in this hot water-washed product was 3.0%, and the free copper was 0.59%.

On the other hand, as an acid-washed product, 169 g of copper phthalocyanine was obtained. The amount of the DMF impurities in this product was 1.2%, and the free copper was 0.22%. The results of tests on the quality of pigmentation products of such hot water-washed product and acid-washed product by a dry milling method are shown in Tables 1 and 2.

EXAMPLE 3

The operation was conducted in the same manner as in Example 1 except that the amount of sulfur added, was changed to 1.44 g, to obtain 172 g of copper phthalocyanine as a hot water-washed product. The amount of the DMF impurities in this hot water-washed product was 1.9%, and the free copper was 0.48%.

On the other hand, as an acid-washed product, 169 g of copper phthalocyanine was obtained. The amount of the DMF impurities of this product was 0.7%, and the free copper was 0.15%. The results of tests on the quality of pigmentation products of such hot water-washed product and acid-washed product by a dry milling method are shown in Tables 1 and 2.

EXAMPLE 4

The operation was conducted in the same manner as in Example 1 except that in addition to sulfur, 0.2 g of anhydrous sodium sulfide was added, to obtain 172 g of copper phthalocyanine as a hot water-washed product. The amount of the DMF impurities of this product was 2.4%, and the free copper was 0.49%.

On the other hand, as an acid-washed product, 168 g of copper phthalocyanine was obtained. The amount of the DMF impurities in this product was 0.7%, and the free copper was 0.15%.

The results of tests on the quality of pigmentation products of such hot water-washed product and acid-washed product by a dry milling method are shown in Tables 1 and 2.

EXAMPLE 5

The operation was conducted in the same manner as in Example 1 except that instead of adding sulfur, 2.68 g of copper (II) sulfide was used, and 27.5 g of cuprous chloride was used, to obtain 170 g of copper phthalocyanine as a hot water-washed product. The amount of the DMF impurities of this product was 2.5%, and the free copper was 0.31%.

On the other hand, as an acid-washed product, 167 g of copper phthalocyanine was obtained. The amount of the DMF impurities of this product was 0.9%, and the free copper was 0.13%.

The results of tests on the quality of pigmentation products of such hot water-washed product and acid-washed product by a dry milling method are shown in Tables 1 and 2.

EXAMPLE 6

The operation was conducted in the same manner as in Example 5 except that 3.35 g of copper (II) sulfide was used, and cuprous chloride was used in an amount of 26.8 g, to obtain 171 g of copper phthalocyanine as a hot water-washed product. The amount of the DMF impurities of this product was 2.1%, and the free copper was 0.28%.

On the other hand, as an acid-washed product, 168 g of copper phthalocyanine was obtained. The amount of the DMF impurities of this product was 0.7%, and the free copper was 0.12%.

The results of tests on the quality of pigmentation products of such hot water-washed product and acid-washed product by a dry milling method are shown in Tables 1 and 2.

TABLE 1

| | Solvent: tert-amylbenzene Additive | |
|---|---|---|
| Example No. | Type | Amount relative to the phthalic acid or its derivative (%) |
| Example 1 | Sulfur | 0.50 |
| Example 2 | Sulfur | 0.36 |
| Example 3 | Sulfur | 1.44 |
| Example 4 | Sulfur | 0.5 |
| | Sodium sulfide | 0.11 |
| Example 5 | Copper (II) sulfide | 1.49 |
| Example 6 | Copper (II) sulfide | 1.86 |
| Comparative Example 1 | Nil | — |

| | Solvent: tert-amylbenzene Hot water-washed product | | | | |
|---|---|---|---|---|---|
| | DMF impurities | Free | Proportion (%) of the α-form as the time passed during solvent treatment Time passed (hr) | | |
| Example No. | (%) | copper (%) | 0 | 0.25 | 1 |
| Example 1 | 2.3 | 0.51 | 23 | 7 | 4 |
| Example 2 | 3.0 | 0.59 | 31 | 16 | 9 |
| Example 3 | 1.9 | 0.48 | 25 | 8 | 5 |
| Example 4 | 2.4 | 0.49 | 24 | 8 | 5 |
| Example 5 | 2.5 | 0.31 | 29 | 11 | 6 |

TABLE 1-continued

| Example 6 | 2.1 | 0.28 | 23 | 8 | 5 |
| Comparative Example 1 | 3.9 | 0.70 | 38 | 36 | 35 |

TABLE 2

Solvent: tert-amylbenzene

| | Additive | |
| --- | --- | --- |
| Example No. | Type | Amount relative to the phthalic acid or its derivative (%) |
| Example 1 | Sulfur | 0.50 |
| Example 2 | Sulfur | 0.36 |
| Example 3 | Sulfur | 1.44 |
| Example 4 | Sulfur | 0.5 |
|  | Sodium sulfide | 0.11 |
| Example 5 | Copper (II) sulfide | 1.49 |
| Example 6 | Copper (II) sulfide | 1.86 |
| Comparative Example 1 | Nil | — |

Solvent: tert-amylbenzene
Acid-washed product

| | | | Proportion (%) of the α-form as the time passed during solvent treatment | | |
| --- | --- | --- | --- | --- | --- |
| | DMF impurities | Free | | Time passed (hr) | |
| Example No. | (%) | copper (%) | 0 | 0.25 | 1 |
| Example 1 | 0.7 | 0.17 | 18 | 3 | 0 |
| Example 2 | 1.2 | 0.22 | 22 | 7 | 2 |
| Example 3 | 0.7 | 0.15 | 18 | 4 | 0 |
| Example 4 | 0.7 | 0.15 | 20 | 4 | 0 |
| Example 5 | 0.9 | 0.13 | 22 | 6 | 1 |
| Example 6 | 0.7 | 0.12 | 17 | 5 | 0 |
| Comparative Example 1 | 1.9 | 0.28 | 29 | 22 | 16 |

COMPARATIVE EXAMPLE 1

The operation was conducted in the same manner as in Example 1 except that no sulfur was added, to obtain 174 g of copper phthalocyanine as a hot water-washed product. The amount of the DMF impurities in this hot water-washed product was 3.9%, and the free copper was 0.70%.

On the other hand, as an acid-washed product, 171 g of copper phthalocyanine was obtained. The amount of the DMF impurities of this product was 1.9%, and the free copper was 0.28%.

The results of tests on the quality of pigmentation products of such hot water-washed product and acid-washed product by a dry milling method are shown in Tables 1 and 2.

EXAMPLE 7

The operation was conducted in the same manner as in Example 6 except that 500 g of 1,2,4-trichlorobenzene was used instead of tert-amylbenzene as the solvent for reaction, to obtain 171 g of copper phthalocyanine as a hot water-washed product. The amount of the DMF impurities of this product was 1.3%, and the free copper was 0.37%.

On the other hand, as an acid-washed product, 170 g of copper phthalocyanine was obtained. The amount of the DMF impurities of this product was 0.7%, and the free copper was 0.05%.

The results of tests on the quality of pigmentation products of such hot water-washed product and acid-washed product by a dry milling method are shown in Tables 3 and 4.

COMPARATIVE EXAMPLE 2

The operation was conducted in the same manner as in Example 7 except that 30.3 g of cuprous chloride was used without using copper (II) sulfide, to obtain 173 g of copper phthalocyanine as a hot water-washed product. The amount of the DMF impurities in this hot water-washed product was 4.6%, and the free copper was 0.62%.

On the other hand, as an acid-washed product, 171 g of copper phthalocyanine was obtained. The amount of the DMF impurities of this product was 2.3%, and the free copper was 0.13%.

The results of tests on the quality of pigmentation products of such hot water-washed product and acid-washed product by a dry milling method are shown in Tables 3 and 4.

TABLE 3

Solvent: 1,2,4-trichlorobenzene
Hot water-washed product

| | Additive | | | | Proportion (%) of the α-form as the time passed during solvent treatment | | |
| --- | --- | --- | --- | --- | --- | --- | --- |
| | | Amount relative to the phthalic acid or its | DMF impurities | Free copper | | Time passed (hr) | |
| Example No. | Type | derivative (%) | (%) | (%) | 0 | 0.25 | 1 |
| Example 7 | Copper (II) sulfide | 1.86 | 1.3 | 0.37 | 30 | 20 | 12 |
| Comparative Example 2 | Nil | — | 4.6 | 0.62 | 39 | 38 | 35 |

TABLE 4

| | | Solvent: 1,2,4-trichlorobenzene Acid-washed product | | | | | |
|---|---|---|---|---|---|---|---|
| | Additive | | | | Proportion (%) of the α-form as the time passed during solvent treatment Time passed (hr) | | |
| Example No. | Type | Amount relative to the phthalic acid or its derivative (%) | DMF impurities (%) | Free copper (%) | 0 | 0.25 | 1 |
| Example 7 | Copper (II) sulfide | 1.86 | 0.7 | 0.05 | 15 | 2 | 0 |
| Comparative Example 2 | Nil | — | 2.3 | 0.13 | 27 | 21 | 14 |

The copper phthalocyanine obtainable by the method of the present invention has a feature that it is possible to obtain a product containing little free copper and impurities which hinder industrial treatment such as pigmentation. Especially, (1) the transformation rate of the crystal form can be improved in the solvent treatment for pigmentation by a dry milling method. By the improvement of this transformation rate, the time for the pigmentation treatment can be shortened, whereby the production costs can be substantially reduced. (2) The free copper being little provides an industrial advantage such that a load in the copper ion treatment at the time of treating the discharged waste liquid, can be reduced in the pigmentation treatment with sulfuric acid or the like.

What is claimed is:

1. The method for producing copper phthalocyanine, which comprises:

heating and reacting (i) phthalic acid or a phthalic acid derivative, (ii) urea or a urea derivative, and (iii) copper or a copper compound, (iv) molybdenum or a molybdenum compound as a catalyst and (v) sulfur.

2. The method according to claim 1, wherein the sulfur is present in an amount of from 0.05 to 4 wt % relative to the phthalic acid or its derivative.

3. The method according to claim 1, wherein the reaction is conducted in the presence of an inert organic solvent.

4. The method according to claim 3, wherein said solvent is present in an amount ranging from 1.5 to 7 times by weight the amount of phthalic acid or derivative thereof which is present.

5. The method according to claim 4, wherein said amount ranges from 1.7 to 3 times by weight the amount of phthalic acid or derivative thereof.

6. The method according to claim 3, wherein said solvent is a hydrocarbon solvent, a halogenated aromatic hydrocarbon solvent or a nitro group containing aromatic hydrocarbon solvent.

7. The method according to claim 1, wherein said reaction is conducted at a temperature ranging from 140° to 250° C. at a reaction pressure within the range of 0 to 20 kg/cm$^2$g.

8. The method according to claim 7, wherein said reaction temperature ranges from 170° to 220° C. and said pressure ranges from 2 to 5 kg/cm$^2$g.

9. The method according to claim 1, wherein said molybdenum containing catalyst is present in an amount ranging from 0.003 to 5 wt. % based on the amount of said phthalic acid or derivative thereof.

10. The method according to claim 9, wherein said amount of molybdenum containing catalyst ranges from 0.02 to 0.5 wt. %.

11. The method according to claim 1, wherein said molybdenum compound is sodium molybdate, ammonium molybdate, ammonium phosphorous molybdate or molybdenum oxide.

12. The method according to claim 1, wherein said copper compound is copper oxide, copper hydroxide, copper sulfate, cuprous chloride, cupric chloride or copper acetate.

13. The method according to claim 1, wherein the amount of said copper or copper compound ranges from 0.2 to 0.3 mol per mol of phthalic acid or derivative thereof.

14. The method according to claim 13, wherein the amount of said copper or copper compound ranges from 0.23 to 0.27 mol per mol of phthalic acid or derivative thereof.

15. The method according to claim 1, wherein said derivative of phthalic acid is phthalic anhydride, phthalimide, sodium phthalate, phthalamic acid, phthalonitrile or mixtures thereof.

16. The method according to claim 1, wherein the amount of said urea or derivative thereof ranges from 1.5 to 3.5 mol per mol of phthalic acid or derivative thereof.

17. The method according to claim 16, wherein said amount of urea or derivative thereof ranges from 2.0 to 3.0 mol per mol of phthalic acid or derivative thereof.

18. The method according to claim 1, wherein said urea derivative is biuret or triuret.

19. A method of producing copper phthalocyanine, which comprises heating and reacting (i) phthalic acid or a phthalic acid derivative, (ii) urea or a urea derivative, and (iii) copper or a copper compound, (iv) molybdenum or a molybdenum compound as a catalyst and (v) copper sulfide, wherein the copper sulfide replaces a portion of the copper compound for the synthesis of the copper phthalcyanine.

20. A method of pigmenting a substance, comprising:

mixing the copper phthalocyanine produced by the method of claim 1 in a substance to be pigmented.

21. The method according to claim 20, wherein said mixing is a dry milling step.

22. The method of claim 19, wherein the copper sulfide is present in an amount of from 0.05 to 4 wt. %, calculated as sulfur, relative to the phthalic acid or its derivative.

* * * * *